US011128579B2

(12) United States Patent
Magliozzi et al.

(10) Patent No.: US 11,128,579 B2
(45) Date of Patent: Sep. 21, 2021

(54) SYSTEMS AND PROCESSES FOR OPERATING AND TRAINING A TEXT-BASED CHATBOT

(71) Applicant: AdmitHub PBC, Boston, MA (US)

(72) Inventors: Andrew Magliozzi, Arlington, MA (US); Charles DeTar, Bozeman, MT (US); Brandon Horst, Somerville, MA (US); Peter Corey, Ooltewah, TN (US); Buruk Aregawi, Englewood, NJ (US)

(73) Assignee: AdmitHub PBC, Boston, MA (US)

( * ) Notice: Subject to any disclaimer, the term of this patent is extended or adjusted under 35 U.S.C. 154(b) by 904 days.

(21) Appl. No.: 15/720,234

(22) Filed: Sep. 29, 2017

(65) Prior Publication Data

US 2018/0131645 A1 May 10, 2018

Related U.S. Application Data

(60) Provisional application No. 62/401,473, filed on Sep. 29, 2016.

(51) Int. Cl.
| | |
|---|---|
| *H04L 12/58* | (2006.01) |
| *G06Q 10/10* | (2012.01) |
| *G06F 40/30* | (2020.01) |
| *G06Q 50/20* | (2012.01) |

(52) U.S. Cl.
CPC ............ *H04L 51/02* (2013.01); *G06F 40/30* (2020.01); *G06Q 10/107* (2013.01); *H04L 51/066* (2013.01); *G06Q 50/205* (2013.01)

(58) Field of Classification Search
USPC ......................................................... 706/12
See application file for complete search history.

(56) References Cited

U.S. PATENT DOCUMENTS

| | | | |
|---|---|---|---|
| 9,420,437 B2 | 8/2016 | Johnston et al. | |
| 9,946,511 B2 | 4/2018 | Gelfenbeyn et al. | |
| 10,311,037 B2 | 6/2019 | Turim et al. | |
| 10,645,034 B2 * | 5/2020 | Lalji | H04L 51/02 |
| 10,776,082 B2 * | 9/2020 | Dey | G06F 40/30 |
| 10,846,194 B1 * | 11/2020 | Krebs | G08B 21/182 |
| 2012/0041903 A1 | 2/2012 | Beilby et al. | |

(Continued)

*Primary Examiner* — Li Wu Chang
(74) *Attorney, Agent, or Firm* — Smith Baluch LLP

(57) ABSTRACT

Current chatbot systems cannot understand enough different topics to converse with students who have questions about college admissions, financial aid, courses, and other topics on the path to and through college. Current chatbots also have a hard time understanding misspellings, slang, and context-specific language, e.g., like the language used by students. "Learning" new topics is very time-consuming for current chatbots. And it is difficult for administrators to participate in student conversations carried out in part by current chatbots. To address these technical problems, an inventive chatbot uses a natural language processor (e.g., a neural network) to receive, classify, and respond to queries on thousands of different topics. An inventive chatbot can also request real-time assistance from an administrator when faced with a difficult query and learn on-the-fly from the administrator's response. This ability to learn on-the-fly gives inventive chatbots significant performance advantages over current chatbots.

18 Claims, 7 Drawing Sheets

(56) References Cited

U.S. PATENT DOCUMENTS

| | | |
|---|---|---|
| 2014/0087697 A1 | 3/2014 | Johnston et al. |
| 2014/0122056 A1 | 5/2014 | Duan |
| 2014/0122407 A1 | 5/2014 | Duan |
| 2014/0122619 A1 | 5/2014 | Duan |
| 2014/0280623 A1 | 9/2014 | Duan |
| 2015/0254061 A1 | 9/2015 | Gelfenbeyn et al. |
| 2016/0323723 A1 | 11/2016 | Johnston et al. |
| 2017/0104701 A1 | 4/2017 | Turim et al. |
| 2017/0104702 A1 | 4/2017 | Turim et al. |
| 2017/0104863 A1 | 4/2017 | Turim et al. |
| 2017/0310613 A1* | 10/2017 | Lalji .................... H04L 63/083 |
| 2018/0131645 A1* | 5/2018 | Magliozzi ............... G06F 40/30 |

* cited by examiner

SYSTEMS AND PROCESSES FOR OPERATING AND TRAINING A TEXT-BASED CHATBOT

CROSS-REFERENCE TO RELATED APPLICATION(S)

This application claims the priority benefit, under 35 U.S.C. § 119(e), of U.S. Application No. 62/401,473, filed on Sep. 29, 2016, and entitled "Process, Interface, and Software Architecture for Operating and Training a Text-Based Chatbot Using Machine Learning." This application is incorporated herein by reference in its entirety.

BACKGROUND

Businesses and other organizations providing customer support or customer service should possess the capability to interact with a vast audience. For instance, a college or university may interact with a large group of students to provide counseling. Similarly, medical representatives may interact with several healthcare professionals to increase awareness of a medical product. Traditionally, such customer support is provided by hiring staff capable of providing appropriate advice. However, not all businesses can afford the staff capability required to provide the desired level of customer support.

SUMMARY

The present technology includes methods and systems to train a chatbot. An example method includes generating a first set of data to train the chatbot via a processor. The processor can generate a model based at least in part on the first set of data. The processor can generate the model using at least one natural language technique. The method also includes obtaining a first query from a user via a user interface provided by or operably coupled to the processor. In response to the first query, the processor transmits a question included in a workflow to the user via the user interface. The workflow can be generated, e.g., by the processor, based at least in part on the model. In response to the question, the processor obtains at least a first response from the user via the user interface. The method also includes storing, in a memory coupled to the processor, at least the first response as a second set of data to train the chatbot. The processor can update the model based on the second set of data. The method also includes training the chatbot based at least in part on the model via the processor.

In some cases, training the chatbot further comprises obtaining a second query from the user via the user interface. In response to the second query, the processor generates a second response to the user based on the model.

In some instances, the method can further include generating a confidence value for the second response via the processor. The confidence value indicates a probability with which the second response is an accurate response to the second query. The processor can determine whether the confidence value for the second response is greater than a predetermined confidence threshold. In response to determining that the confidence value is greater than the predetermined confidence threshold, the processor may transmit the second response to the user via the user interface. If the confidence value is less than the predetermined threshold, the processor may generate a plurality of choices, each of which can be a possible response to the second query. The processor transmits the second query and the choices to an administrator. The processor obtains a choice from the plurality of choices from the administrator. The choice can be selected by the administrator as a response to the second query. The choice can be transmitted via the user interface as the response to the second query.

In some instances, generating the first set of data further includes scanning and extracting information from a pre-existing document, a website, or both. The information can be used for generating the first set of data.

In some instances, training the chatbot further includes obtaining an approval or disapproval of the second response from the user via the user interface. The approval can indicate an agreement by the user that the second response is an accurate response to the second query and the disapproval can indicate a disagreement by the user that the second response is the accurate response to the second query. The processor may update the model based on the approval or disapproval.

The present technology also includes methods and systems for providing automated system-agnostic assistance to a user. An example method includes obtaining a query from the user via a chat system interface. The query can be in a first form compatible with a chat system. A processor can transform the first form of query to a second form. The second form can be compatible with an email system. An email system interface transmits the second form of the query to an administrator. The method also includes obtaining a response from the administrator via the email system interface. The response can be in the second form compatible with the email system. The processor can transform the second form of the response to the first form. The first form can be compatible with the chat system. The response can be transmitted to the user in the first form via the chat system interface.

In some instances, the processor generates a model based on at least one natural language processing technique. The processor can generate a plurality of responses based on the model. Each of the responses can be a possible response to the query. The email system interface transmits the responses to the administrator and obtains one response from the administrator. This response from the administrator can be one of the responses transmitted to the administrator.

In some instances, generating the model includes extracting a first set of information from at least one of a pre-existing document or a website and generating the model via the processor based on the first set of information.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4 illustrates an example dashboard provided to an administrator who is responsible for reviewing and participating in the chat process, e.g., via the administrator user interface of the chatbot system shown in FIG. 1.

FIG. 5 illustrates an example dashboard visible to an administrator when the administrator decides to edit a knowledge base entry, e.g., via the administrator user interface of the chatbot system shown in FIG. 1.

DETAILED DESCRIPTION

Figure 1:
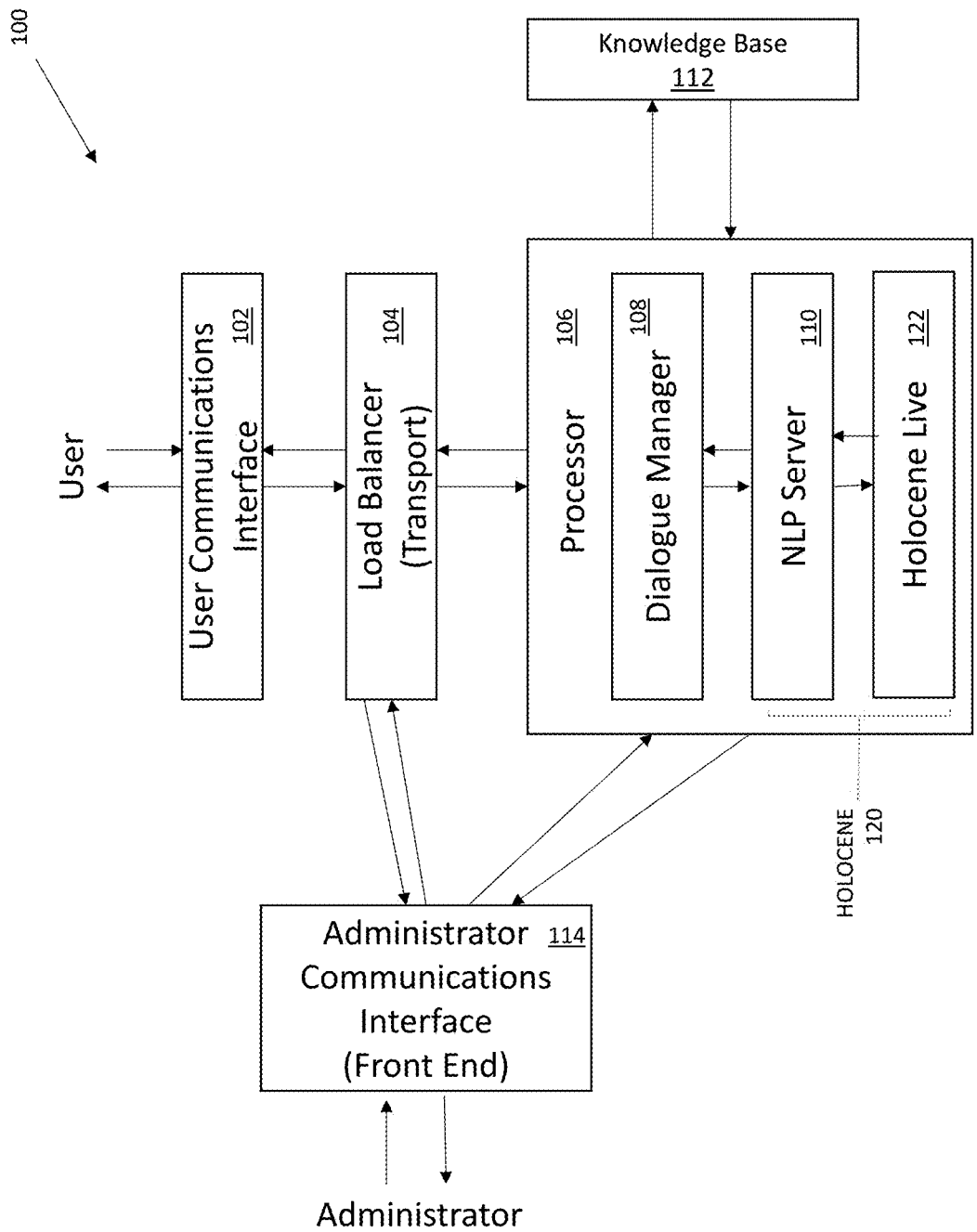
FIG. 1 shows a schematic diagram of an example chatbot system suitable for providing customer support, e.g., in the context of admissions, financial aid, and/or guidance counseling for college students.

Customer support representatives are often required to engage in one-to-one communication with customers. For example, college counselors providing advice related to admissions engage in one-to-one communications with prospective students. Medical representatives engage in one-to-one communications with healthcare representatives to pitch medical products. Seamless interaction and continuous engagement with customers can benefit businesses financially. Research indicates that most customers today appreciate text-based nudges and interventions from businesses. However, in order to provide continuous engagement using platforms (e.g., text-based platforms) that the user is comfortable with requires significant human power. Not all businesses can afford to support a large staff.

In more recent times, chatbots have been designed to provide partial support to customers. However, such chatbots provide only one-way support. Specifically, existing chatbots are not designed for continuous engagement with users. That is, an end user can ask a chatbot questions and receive answers to those questions from the chatbot or the chatbot can provide an automated questionnaire to the end user and receive answers to the questionnaire from the user. Existing chatbots cannot provide both of these functionalities simultaneously. For instance, existing chatbots are not designed to ask an end user targeted questions and also answer questions from the end user in an integrated fashion.

Furthermore, existing chatbots are not designed to handle queries pertaining to more than a few hundred topics. That is, existing chatbots can provide support only if the query from the user falls within a narrow range of topics that the chatbot is designed to handle. For example, chatbots for banking institutions are trained on a narrow range of topics relating to credit, debit, etc. These chatbots are not trained to respond to questions relating to food options near a particular banking branch. Thus, existing chatbots cannot provide support for a vast range of discrete topics. Handling discrete topics is especially beneficial for organizations such as universities. For example, prospective students seeking support for admissions can make inquiries about a range of topics, such as financial opportunities, scholarships, classes, housing, job opportunities, food options, culture, demographics, etc. Designing a chatbot with the breadth and depth of such vast discrete knowledge requires significant feature engineering and algorithm engineering.

In addition, with the rise in popularity of online-based text communications, chat acronyms and text message shorthand have become popular. Messages pertaining to the same query can be drastically different depending on the age of the user. Existing chatbots do not take into account the age of the user while handling queries. They do not take into account chat acronyms and text message shorthand while handling queries.

Organizations can benefit from employing chatbots that learn quickly. More specifically, once a chatbot obtains new information, the chatbot has to be trained to update its knowledge base to include the new information. That is, once the new information is received, a model (e.g., a neural network model, natural language model, etc.) included in the chatbot undergoes incremental training process. The new model containing the updated knowledge is transferred to a knowledge base. The updated model has to be fetched by a sever that provides answers to end users. The entire process in existing chatbots often take several weeks to months. Existing chatbots do not have the ability to learn fast.

In some instances, it could be beneficial to allow an administrator to participate in conversations with users to train the chatbots. However, not all administrators possess the technical skill to train a chatbot along with possessing the subject knowledge to respond to user queries.

The present technology provides chatbots that provide continuous, two-way support and ways to train an artificially intelligent chatbot by engaging with users in an interactive manner. These chatbots implement fast learning and are designed to handle queries from users on a discreet range of topics while accounting for missing characters and misspellings. When a user begins to communicate with the chatbot, the chatbot can gather structured and unstructured data from the user through a series of automated workflows and branching questionnaires. The chatbots can also provide nudge reminders and helpful tips to the user via a user preferred platform. The chatbot also allows an administrator to participate in conversations to train the chatbot. The chatbot's interface for the administrator is simple and user friendly and does not require the administrator to have technical knowledge (e.g., knowledge in artificial intelligence) to train the chatbot.

Example Chatbot System

FIG. 1 is an illustration of a chatbot system 100 that can provide continuous, two-way support. It is suitable for use in counseling students about college admissions, financial aid, courses, etc., among other things. The chatbot system 100 includes a first (user) communications interface 102, a load balancer 104, a processor 106, a database 112, and a second (administrator) user interface 114. The processor 106 implements a dialogue manager 108 and Holocene module 120, which includes a Natural Language Processing (NLP) server 110 and Holocene Live module 122. As readily appreciated by those of ordinary skill in the art, the chatbot system 100 may include other components, such as volatile and non-volatile memory. It may also include more processors, e.g., one for the dialogue manager 108 and one for the NLP server 110.

The first (user) communications interface 102 enables bidirectional communication between a user and the chatbot system 100. The first communications interface 102 is communicatively coupled to a load balancer 104, which analyzes user interaction to distribute and optimizes the workload for the dialogue manager 108, the NLP server 110, the first communications interface 102, and the second (administrator) communications interface 114. The dialogue manager 108 implements procedures to initiate conversations with the user and engage with the user. The NLP server 110 implements machine learning techniques to understand user intent, determine responses, learn responses, and train the chatbot system 100. Structured and unstructured data can be stored in the database 112 and accessed by the NLP server 110 and the dialogue manager 108. The second communications interface 114 enables bidirectional communication between an administrator and the chatbot system 100, enabling the administrator to participate in conversations with the user.

As readily appreciated by those of skill in the art, the dialogue manager 108, and the NLP server 110 can each be implemented as computer-executable code stored in computer-readable, non-volatile memory and executed by the processor 106. The dialogue manager 108 and the NLP server 110 can be collocated or distributed as desired using suitable hardware and connections.

The first communications interface 102 enables bidirectional communication between a user's smartphone, tablet, computer, or other device and the system 100. In some aspects, the user initiates a conversation with the chatbot system 100 by sending messages from his or her phone or computer via the first communications interface 102. These messages may arrive over a variety of channels, including short message service (SMS), Facebook, email, and any other text-based communication channel with an application programming interface (API).

For instance, the user can sign up to seek customer support via the first communications interface 102. The first communications interface 102 can be designed to be compatible with a particular communication platform depending on the application. For instance, in some cases, the first communications interface 102 can enable chat-based communication with the user using an appropriate app or web interface that the user accesses on his or her phone or computer. In other cases, the first communications interface 102 can enable text-based communication with the user's phone. In still other cases, the first communications interface 102 can enable email-based communication with the user via the user's phone or computer.

The load balancer 104 is communicatively coupled with the first communications interface 102. When the user engages in a conversation with the system 100, the load balancer 104 analyzes the conversation to distribute the workload between dialogue manager 108 and NLP server 110. The load balancer 106 is the outward and inward message transport interface for the chatbot system 100. The load balancer 104 can be implemented with simplicity (e.g., about 250 lines of code) to enable durability and scale.

In operation, the load balancer 104 brings stability to the chatbot system 100 so that the system 100 does not miss any messages if the central processor 106 experiences down time. The load balancer 104 accepts an incoming message 106 and places it in a queue where the central processor 106 can access it. When Twilio or Facebook has a message from a user for the chatbot system 100, they send it to the load balancer 104. The load balancer 104 throttles and queues up messages during high load to control the strain on the rest of the chatbot system 100. This allows the system to hold incoming messages reliably if the system 100 goes down for analysis and response when the system 100 is back up.

The dialogue manager 108 is communicatively coupled with the load balancer 104. The dialogue manager 108 can be configured to engage the user with conversations, questionnaire, surveys, reminders, nudges, and other responses. The dialogue manager 108 can be designed as a finite state machine with states and transitions. In this context, the dialogue manager's state is generally the phase or step of a conversation with a user. The state may also reflect or includes stored information about the user (e.g., information acquired during registration or gleaned from previous chats). Changes in stored data about the user (e.g., provided by the administrator or gathered by the chatbot in conversation) can trigger specific conversation topics or workflows. In operation, the dialogue manager 108 can execute procedures and/or methods that implement workflows and fallthroughs, gather data, provide surveys, and send reminders. In the finite state machine view, the system 100 takes a String, updates State, outputs a String, and waits for the next input.

For example, the user may send a question and/or conversation via the first communications interface 102 and the load balancer 104 to the dialogue manager 108. The dialogue manager 108 can trigger a fallthrough (e.g., execute a series of if-else statements or a series of switch statements) to send the request from the dialogue manager 108 to the NLP server 110 for further processing. In another example, when the user initiates communication with the system 100 for the very first time, the communication can be transmitted to the dialogue manager 108 via the first communication interface 102 and the load balancer 104. The dialogue manager 108 can then trigger a workflow to engage the user in conversation. That is, the workflow can include a sequence of operations to ask the user follow-up questions, chat with the user, obtain responses, and store them in the database 112.

In some instances, the dialogue manager 108 can intelligently replace an operation in the workflow with a new operation. For example, say that the dialogue manager 108 triggers a workflow to ask the user questions in a questionnaire. The workflow can be designed such that each time the dialogue manager 108 obtains an answer from the user to a question, the question-answer pair is stored in the database 112. However, if for a given question, the user responds by asking another question instead of responding with an answer, the dialogue manager 108 can detect the user's response as a new question. In such a scenario, instead of triggering an operation within the workflow to ask the next question, the dialogue manager 108 can replace this operation to trigger a new operation to transmit the user's question to the NLP server 110 for further analysis.

The NLP server 110 is part of a Holocene module 120 communicatively coupled to the dialogue manager 108. The NLP server 110 can implement machine learning techniques, such as preprocessing techniques, pattern matching, fuzzy matching, N-grams, classifiers, Word2Vec, deep learning, and neural networks, to further process the conversation between the user and the system 100 as well as interactions between the administrator and the system 100. For instance, say the dialogue manager 108 triggers a workflow to ask the user a series of questions in a questionnaire. If, the user responds to a given question by asking another question instead of responding with an answer, the dialogue manager 108 detects that the user's response is a question and transmits the question to the NLP server 110. The NLP server 110 accepts the question (e.g., as a string) along with the user's data and the user's state (e.g., payload) and determines the intent of the question through a multi-stage preprocessing, parsing, and classification process. The NLP server 110 returns the result along with a match score and a corresponding answer to the dialogue manager 108.

The Holocene module 120 also includes a continuous encoding component, also called a Holocene Live module 122, that constantly checks for changes in the database 112. When the Holocene Live module 122 detects a change, it preprocesses and transforms the data using a neural network (described in greater detail below) and pushes it to cloud storage. A component of the NLP server 110 pulls down the data and updates the interdependencies in the cache that is used to answer user queries and triager searches.

In some instances, the NLP server 110 includes a neural network to train the system 100 to determine responses to questions. For example, in higher education or healthcare, end users usually ask similar questions (e.g., "When is the orientation?," or "What is your address?"). The neural network included in the NLP server 110 can train a global set of questions with a local collection of answers for a particular industry. The local collection of answers can be accessed from the database 112 where it is stored. These answers can be stored by an administrator or they can be answers that the system 100 has learned over time. In some cases, the administrator can access the questions and answers and approve and/or disapprove of the answers. The administrator's approval and/or disapproval of the answers can be transmitted to the NLP server 110 to update the neural network. In this manner, as the system 100 interacts with users, the knowledge pool for the system 100 increases and the neural network gets smarter, thereby increasing the intelligence of the system 100.

The database 112 is communicatively coupled with the dialogue manager 108 and the NLP server 110. It may include a knowledge base, with question and answer data for the NLP server 110, and a user database, with user data for the dialogue manager 108. A separate message queue stores message data for the load balancer and dialogue manager. With the load balancer 104, the message queue provides resiliency by storing each message until it has successfully run through the entire chatbot system 100.

The database 112 can store question-answer pairs, user data, user preferences, important reminders, and tips. The NLP server 110 and the dialogue manager 108 can access the database 112 to obtain appropriate information that can be used to engage the user with the system 100. Structured and unstructured data obtained from the user, the administrator, the NLP server 110, and the dialogue manager 108 can be stored in the database 112. In some cases, the database 112 may include or be augmented with databases for users, bot knowledgebase, and message queue.

The second communications interface 114 can be communicatively coupled to the load balancer 104, the dialogue manager 108, and the NLP server 110. The second communications interface 114 enables bidirectional communication between an administrator and the system 100, e.g., via a website and web browser. In some aspects, the second communications interface 114 can provide an intuitive, internet-based dashboard that enables the administrator to monitor activity between the user and the chatbot system 100 and access any or all on-going conversations in real time. In other aspects, the second communications interface 114 can provide the administrator limited access by directing specific questions from the user or specific conversations between the user and the system 100 to the administrator. The second communications interface 114 can be designed to be compatible with a particular communication platform depending on the application. For instance, in some cases, the second communications interface 114 can enable email-based communication with the administrator. In other cases, the second communications interface 114 can enable text-based communication with the administrator. In still other cases, the second communications interface 114 can enable chat-based communication with the user.

Training the Chatbot

Figure 2:
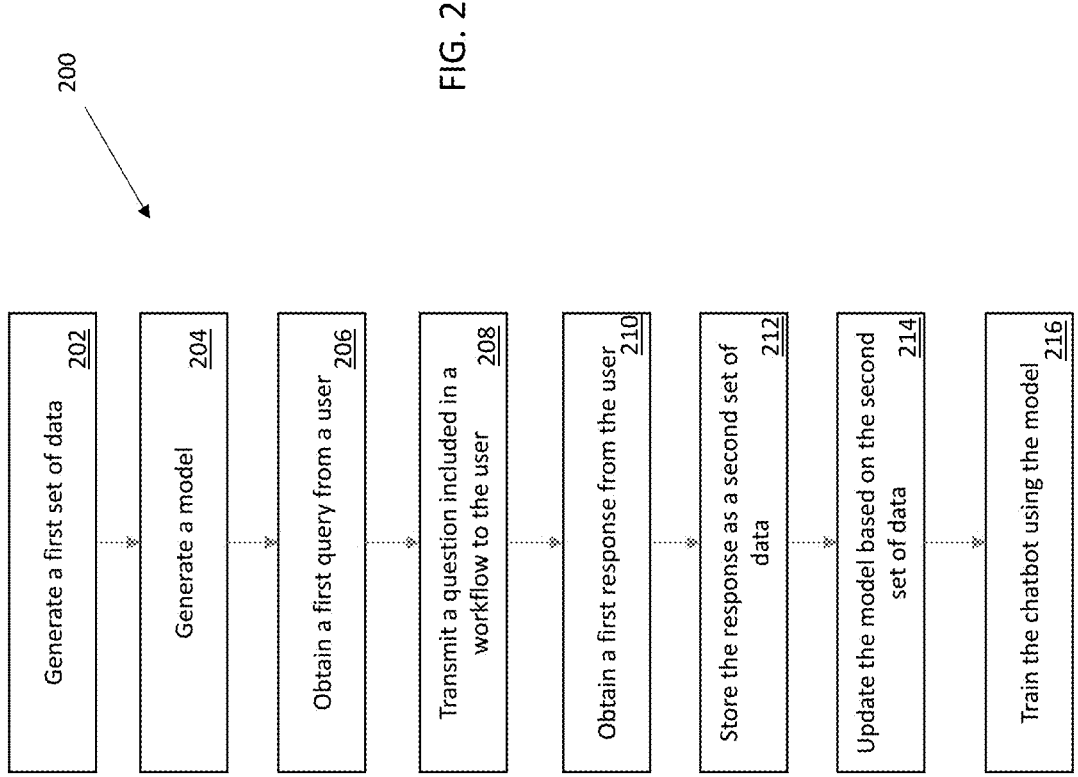
FIG. 2 shows a flow diagram of an example process to train a chatbot provided by the chatbot system shown in FIG. 1.

FIG. 2 illustrates a process 200 of training a chatbot system (e.g., the chatbot system 100 in FIG. 1) to interact with a user. In step 202, a processor, such as the processor 106 in FIG. 1, included in the chatbot system can scan pre-existing documents and/or webpages on the Internet or an intranet to extract initial information for the chatbot. These documents can provide a historical understanding about a specific field, such as understanding/results based on historical data of user behavior in healthcare. The data in the pre-existing documents and/or webpages can be in structured format or in unstructured format. For example, a pre-existing document including Frequently Asked Questions (FAQs) and corresponding answers can be made available to the chatbot. The processor can scan the FAQs and extract question-answer pairs from the FAQs. In another example, raw text (e.g., raw HTML) can be extracted from a webpage. In this manner, a first set of data (e.g., a knowledge seed) is generated for the chatbot.

In step 204, the chatbot generates a language model using NLP techniques based on the first set of data. In one instance, the first set of data can be used as initial training data to train a neural network. Some non-limiting examples of language models that can be generated include unigram models, n-gram models, exponential language models, neural language models, and positional language models. The processor included in the chatbot can implement machine-learning algorithms to parse, process, and classify the first set of data. The language model that is generated based on the first set of data (e.g., knowledge seed) forms the foundational framework based on which the chatbot is initially trained.

In step 206, the chatbot obtains a first query from a user. The first query can be obtained via a communications interface (e.g., first communication interface 102 in FIG. 1). In some instances, the first query represents the first user interaction with the chatbot. For example, the first time the user signs up for a service (e.g., a student signing up as a prospective student on a university website for the first time, or a prospective student sending a single text message to a specific phone number belonging to a university). In another example, the first query could represent the first time the user sends a text-based message or a chat-based message to the chatbot.

In step 208, the first query triggers execution of a procedure (e.g., a fallthrough, a workflow, or other procedure) by the processor (e.g., processor 106 in FIG. 1). Each procedure can include one or more operations for the chatbot to implement. These operations can be sequential, tree-like, etc. For instance, the operations may form a branching and reconnecting tree of conditional paths based on questions posed to the user. For example, a workflow can include a question about whether or not the user has completed the FAFSA. If the user hasn't completed the FAFSA, the chatbot may ask if they have completed part of the FAFSA. And if the user has completed the FAFSA, the chatbot may ask if they have any questions about their loans and grants.

The chatbot system may chat with a user about a variety of topics, including pre- and post-matriculation topics. Examples of pre-matriculation message workflow topics include, but are not limited to:

Getting Ready for College
Getting a Campus ID
FAFSA Completion and Follow Up
Scholarships
Accepting Financial Aid
Tuition Fees
Meal Plan Reminder
Housing Reminder
Orientation Sign-up and Reminders
Accepting Loans
Gap in Financial Aid
Sending Transcripts
Parking Permit Registration
Registering for Courses
Immunization Reminder
Final Sense of Belonging
Final Study Survey
Post-Matriculation Message Workflows Topics:
  FAFSA Completion
  Financial Aid Reapplication
  Scholarships
  Accepting Financial Aid
  Tuition Fees
  Meal Plan Reminder
  Housing Reminder
  Sense of Belonging (first semester)
  Meeting New People
  On Campus Event Reminders
  Attendance Nudges
  Available Academic Resources
Post-Matriculation Workflow Topics:
  Living away from home
  Getting along with roommates
  Intramural sports are awesome
  Becoming involved in on-campus activities
  The benefits of forming study groups
  Making the most of office hours
  Peer tutoring options
  The benefits of breakfast
  How to study for final exams
  The importance of time off
  Importance of sleep & exercise
  Permission to be imperfect
  Study skills & organization
  And many more . . . .

The communications interface (e.g., first communications interface 102 in FIG. 1) transmits the question to the user. In step 210, in response to obtaining the question, the user transmits an answer to the chatbot via the communications interface. In step 212, the chatbot stores the answer to the question in a memory (e.g., database 112 in FIG. 1).

In step 214, the chatbot updates the language model based on the answer obtained from the user. For example, in step 208, if the chatbot asked the user a question regarding the user's children and in step 210, the user responds to the question stating that the user has three children, then the processor can analyze the language model to determine if the language model includes the number of children for that user. If the language model does not include this information, the processor can update the language model accordingly.

In step 216, the chatbot is trained based on the language model. For example, the chatbot, can be trained based on supervised learning or unsupervised learning. As the chatbot obtains more information from the user, the language model is updated and trained, thereby making the model more comprehensive.

Implementing Procedures by the Dialogue Manager

Instructions for procedures can be stored in a memory and implemented by a processor (e.g., processor 106 and/or dialogue manager 108 in FIG. 1). Each procedure (e.g., fallthrough, workflow, or other procedures) can include a sequence of operations for the chatbot to implement. As described in FIG. 2, in response to a first interaction with the user, the dialogue manager can trigger a procedure. For instance, in response to a sign up message from the user, the processor can trigger a workflow to engage with the user. The first operation in the workflow can include uploading the contact information of the user to a memory (e.g., database 112 in FIG. 1). In some cases, the users can also specify other variables during sign up which determine the content and duration of their activity. The workflow can upload all of these variables to the memory.

After each operation in the sequence of operations within a procedure, the chatbot can determine whether to branch to another procedure or continue with other operations in the same procedure. For example, during sign up if the user specifies that the user has children, a separate procedure for finding child care can be automatically triggered. Similarly, during sign up if a student specifies that he/she is seeking financial aid, a separate procedure for finding and applying for scholarships can be automatically triggered. In this manner, the chatbot branches into multiple procedures depending on the information obtained from the user.

The procedures can also include sending reminders or nudges to the users. For example, if the user prefers receiving an alert to apply for financial aid every week until the user has applied for the aid, the same procedure can be triggered once every week that sends a reminder to the user. Once the user applies for the aid, the procedure can branch to another procedure based on the specific needs of the user at that time. In some aspects, users can personalize the specific timing of receiving advice/nudges/tips from the chatbot to fit their needs based on a series of options (e.g., 1 month, 3 months, 6 months, or ongoing). Based on the user preference, the same procedure can be triggered at a frequency preferred by the user.

In some aspects, during the implementation of an operation within a procedure, instead of responding to the chatbot for that specific operation, the user can ask a question. For example, suppose that the chatbot is implementing a procedure to ask a set of questions in a questionnaire. Instead of responding to a specific question with an answer, the user can ask the chatbot another question. In such instances, the processor identifies that the response from the user is not a response to the latest operation implemented/being implemented by the chatbot. Some example techniques implemented by the chatbot to detect questions are:

Presence of a "?" or other punctuation or emoji to symbolically represent a question;
  Failing (optional) validation parameters of the current prompt/procedure (e.g., failure to match a regular expression for a valid email address); and
  Passing an arbitrary truth test on a custom fallthrough function specified on the current prompt/procedure or full questionnaire.

Generating Responses to User Queries by the NLP Server

If the chatbot detects a question from the user, the chatbot determines a response to the question based on the language model. In some aspects, the chatbot determines a context for the question and attempts a semantically informed pattern match. If the semantically informed pattern match does not provide a match that exceeds a pre-defined match threshold, the chatbot implements an ensemble of two complementary language models—a character-aware convolutional model that handles misspells but does not generalize the semantics much and a word-vector and bag-of-keywords single-hidden-layer model that generalizes the semantics of training inputs in a robust fashion but is highly sensitive to misspell noise. Many auxiliary factors such as uncertainty, confusion and the proportion of out-of-vocabulary tokens are used to determine when and how to combine the two models. A response to the question can be determined based on the combination of the two models.

In some aspects, in order to respond to the question, a natural language processor included in the chatbot (e.g., NLP server 110 in FIG. 1) can parse the question based on natural language techniques and process the question using the language model. For example, the NLP server can generate a language model by assigning a vector to each word. Synonyms of words have similar vectors. The NLP server determines the meaning of a sentence by analyzing the concatenation of vectors. If two sentences have a similar and/or same resulting vector, then even if the individual vectors that are concatenated together in each of these sentences are not the same, these sentences can be regarded as synonymous. Hence, the chatbot can provide the same response to both sentences. In this manner, the chatbot can generate responses to user queries based on the language model(s).

Analyzing Confidence Values of Generated Responses

The chatbot system can assign a confidence value to every response that is generated by the NLP server. The confidence value indicates the probability of the response being an accurate response to a particular question. That is, for each question from a user, the NLP server can determine multiple possible responses to the question. For each of these possible responses, the NLP server can assign a probability value indicating the probability of that particular response being an accurate response to the question. The NLP server can then pick the response with highest confidence value as best possible response. The NLP server can compare this confidence value against a pre-defined confidence threshold to determine if the response should be relayed to the user. For example, if the confidence value is greater than the pre-defined threshold the chatbot transmits this response to the user as a response to the question posed by the user.

If the confidence value is less than the pre-defined threshold, the NLP server can transmit the question along with the multiple possible responses to an administrator via a communications interface (e.g., second communications interface 114). The administrator can review the question and the possible responses generated by the NLP server. The administrator can select the best possible answer from among the possible responses or provide an entirely new answer to the NLP server. The chatbot can transmit this answer to the user as an answer to the user's question and update the language model based on the administrator's answer.

Updating the Models and Reinforcement Learning

If the NLP server cannot predict an answer to a question using the language model, it may route the question to an administrator for an answer. The response from the administrator can be transmitted back to the NLP server. The NLP server can then update the language model to include the question and the answer. Next time an end user asks a similar and/or same question, the chatbot can respond to the question based on the updated language model. In some aspects, if the language model cannot predict an answer to a question, the chatbot can scan webpages on the Internet to determine a closest possible answer.

In some aspects, the chatbot can transmit the response to the user via a communications interface. The user can indicate the user's approval or disapproval of the response. For instance, the user may provide information indicating whether or not the response was helpful. Depending on the approval or disapproval, the NLP server can reward and update the language model. That is, if the user approves of a response, the NLP server rewards the language model for that response. In other words, the NLP server can update the language model to include or indicate a higher confidence value for that particular response. If the user disapproves of a response, the NLP server can update the language model to reflect the user's disapproval. In such scenarios, the chatbot can either search the knowledge base for synonyms and update the language model with the synonym or create an entirely new entry with a new answer to handle that particular question in the future.

Administrator Privileges

The chatbot offers administrators at least two methods of participating in user engagement:

Limited Access Via Email Notifications

In some cases, the administrators of organizations are given limited access to user chatbot interactions. For instance, the administrators can selectively receive notifications from the chatbot regarding the context of the conversation. The chatbot transmits these notifications via a communications interface (e.g., second communications interface 114 in FIG. 1) to the administrator.

Figure 3:
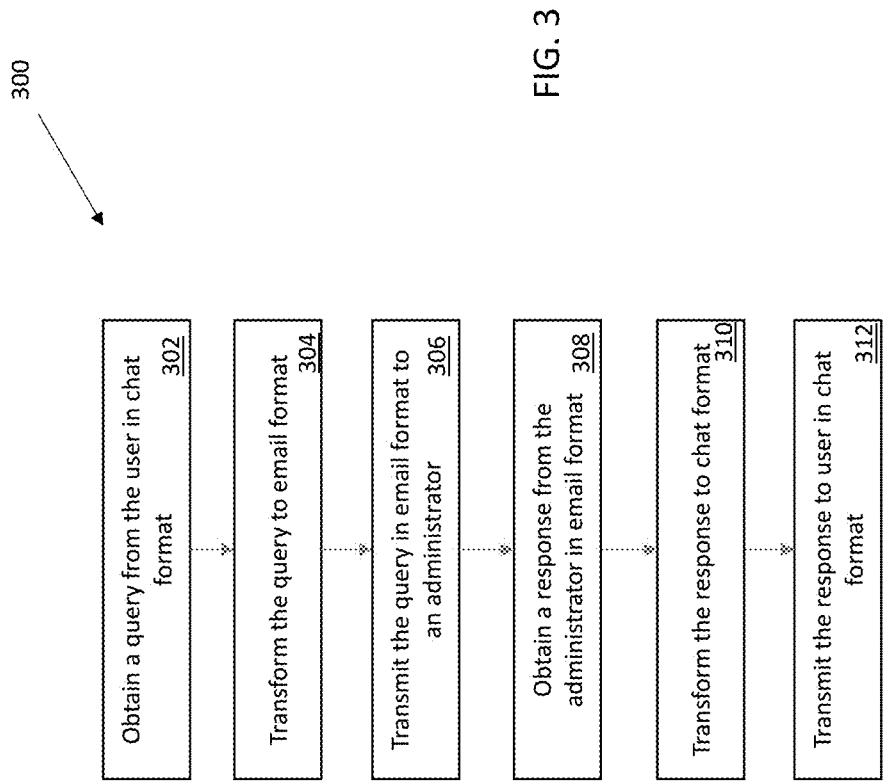
FIG. 3 illustrates a process of providing system-agnostic assistance to a user with the chatbot system shown in FIG. 1.

Suppose that the user transmits a query to the chatbot via one communications platform, such as email or messaging. However, the administrator might have access to a different communications platform. For example, the user might have access to chat-based platforms while the administrator might have access to email-based platforms. FIG. 3 illustrates a process 300 of providing system-agnostic assistance to the user. At 302, the user transmits a chat-based query to the user (e.g., via text message, Facebook™ message, web chat, Kik message, etc.). The chatbot obtains the query via an interface (e.g., first communications interface 102 in FIG. 1) that is compatible with chat-based inputs.

At 304, the chatbot transforms the chat-based query to an email-based query via a processor (e.g., processor 106 in FIG. 1). At 306, the chatbot transmits this email-based query to an administrator via an interface (e.g., second communications interface 114 in FIG. 1) that is compatible with email-based inputs. At 308, the chatbot receives the response to the question from the administrator in email format (e.g., via Gmail™, Yahoo™, etc.). At 310, the chatbot transforms the response to a chat-based format and at 312, the chatbot transmits the response in the form of a chat to the user. This email-to-chat function is interoperable with existing email platforms, allowing the administrator to respond to queries by clicking on a complex mailto link that automatically transforms emails to chat. Below is an example code of the mailto link:

href="mailto:{{messagingService}}+{{conversationId}}@{{oliFrom}}?bcc=bot@admithub.com&subject=Re:%20{{applicantNameEscaped}}%20said,%20%27{{message}}%27&body=%0A⎯⎯⎯⎯Reply%Above%this%20Line%20(please%20limit%20to%2028%20-characters)⎯⎯⎯ "

Complete Access

Figure 4:
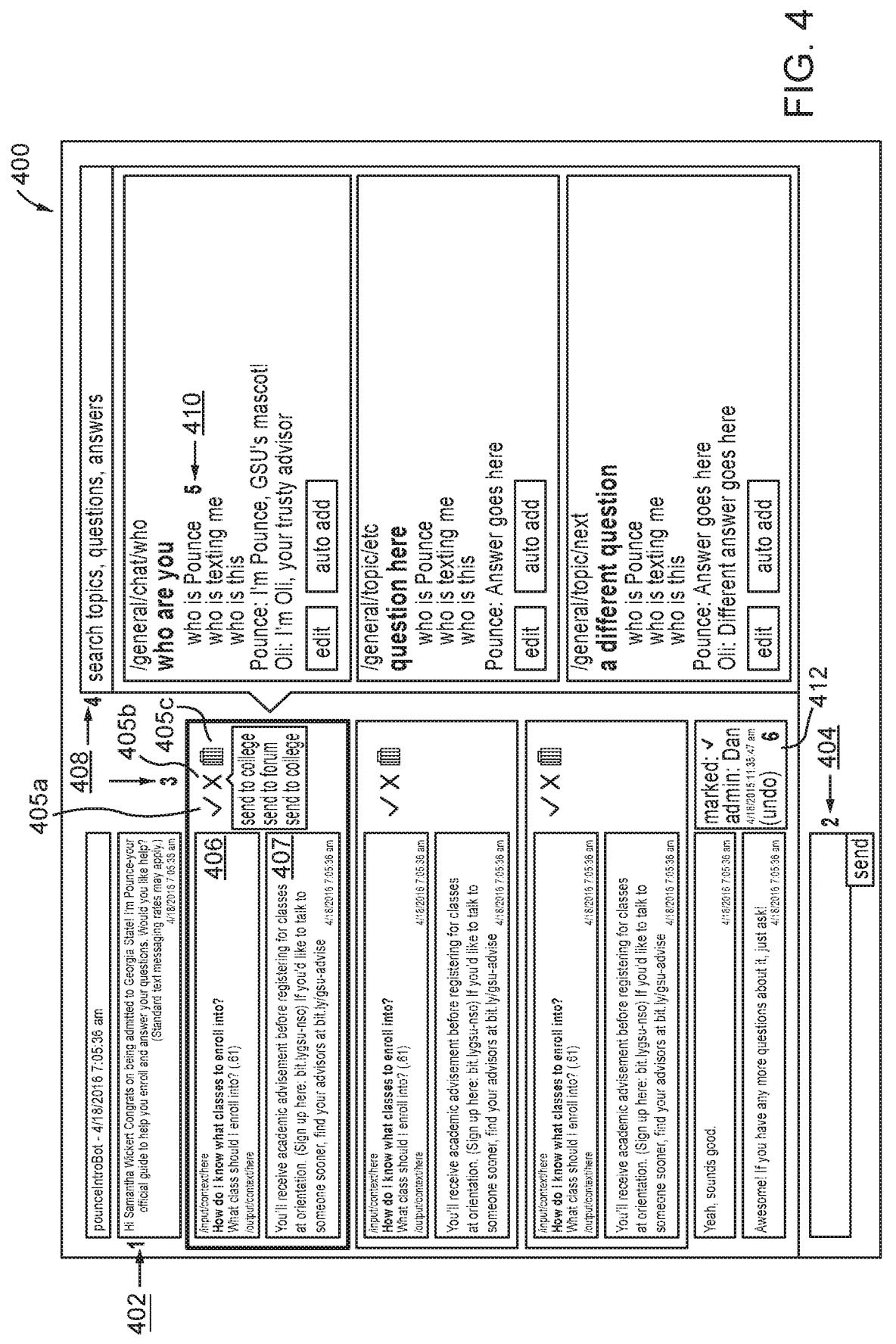
Figure 5:
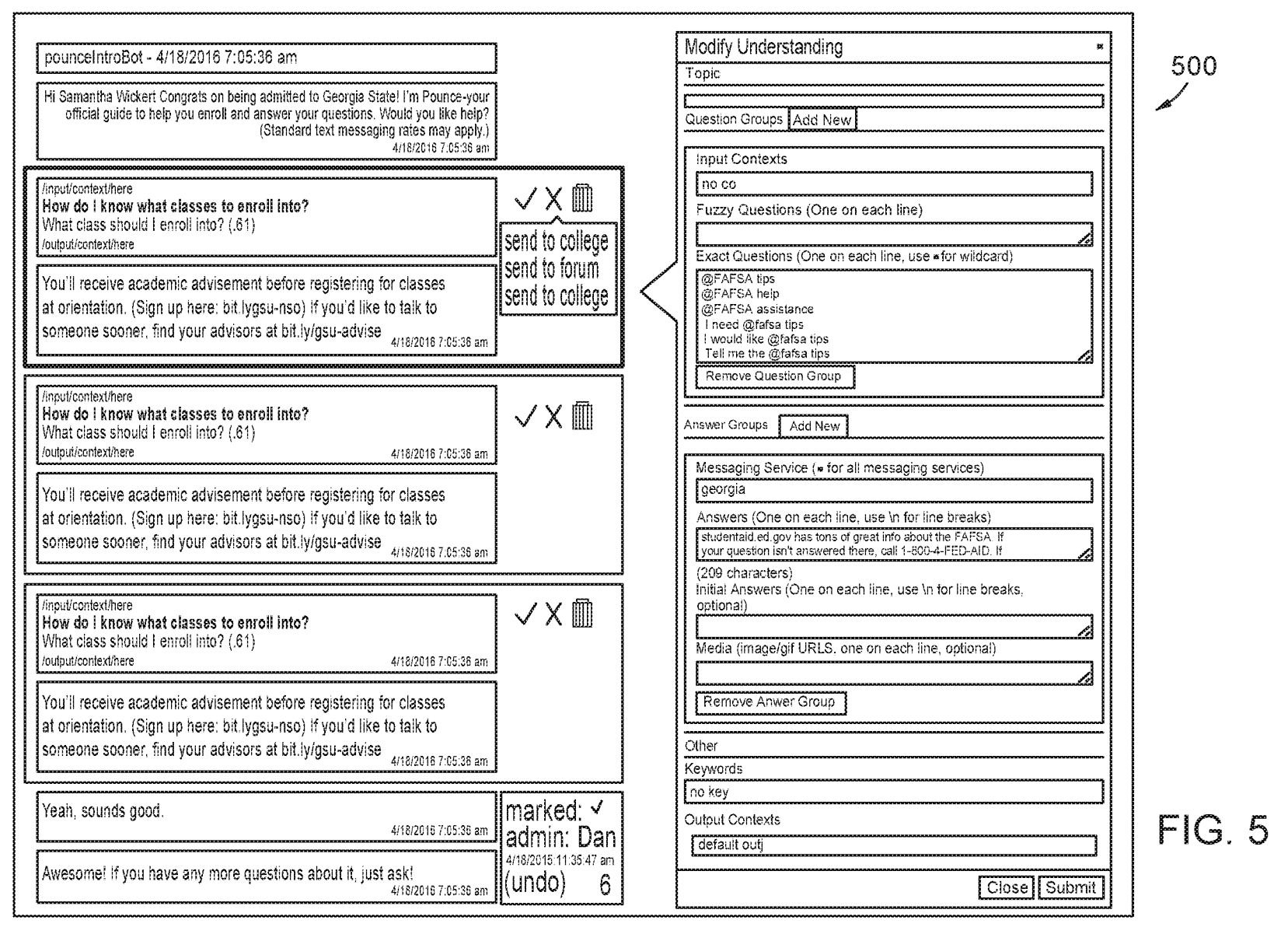

In some cases, the administrators can be provided privileges to see all activity between the user and the chatbot. FIGS. 4 and 5 illustrate example intuitive dashboards that provide administrators access to all conversations. FIG. 4 illustrates an example dashboard 400 visible to an administrator who is responsible for reviewing and participating in the chat process. An example chat log 402 indicates that the chatbot has initiated a conversation with the user. The administrator is provided a textbox interface 404 to send a message to the user if desired. The administrator can review all user questions and automated answers in real time and can complete the supervised machine learning process. For example, chat log 406 indicates a query posted by the user and chat log 407 indicates the response generated by the chatbot. The icons 405a, 405b, and 405c represent approve, fix, and trash (delete), respectively. That is, the administrator has the option to approve the answer, or fix the answer, or delete the answer.

If the chatbot system has given a correct answer, the administrator rewards it by validating the answer (e.g., choosing icon 405a). If an answer is incorrect, the administrator can indicate the problem and has the option (e.g., choosing icon 405b) to correct the issue by searching the knowledge base for a synonym or creating an entirely new entry with a new answer to handle the question in the future. Textbox 408 indicates a search box of the knowledge base. Data 410 indicates the topics, questions, and chatbot answers in the knowledge base. The administrator is given an option to "edit" or "auto-add" the user question being reviewed to an existing topic. FIG. 5 illustrates an example dashboard 500 visible to an administrator when the administrator decides to edit a knowledge base entry.

After the administrator completes these steps, the question, answer, and the administrator activity remain labeled in the chatbot with the option to "undo" the action (see 412).

Example Neural Network Employed by the Chatbot

Figure 6A:
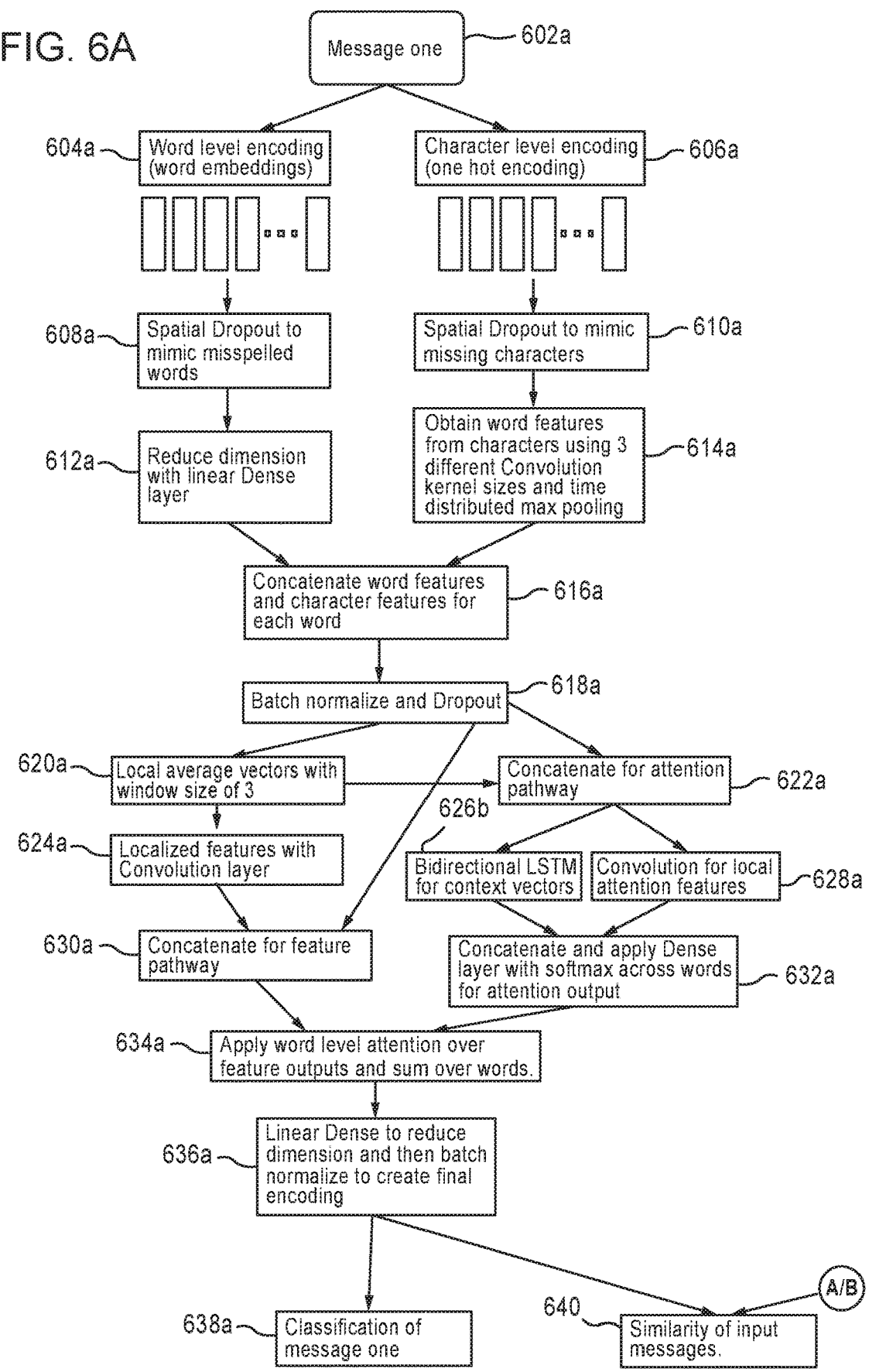
FIGS. 6A and 6B show a neural network architecture suitable for a chatbot system to use in interpreting and classifying messages.
Figure 6B:
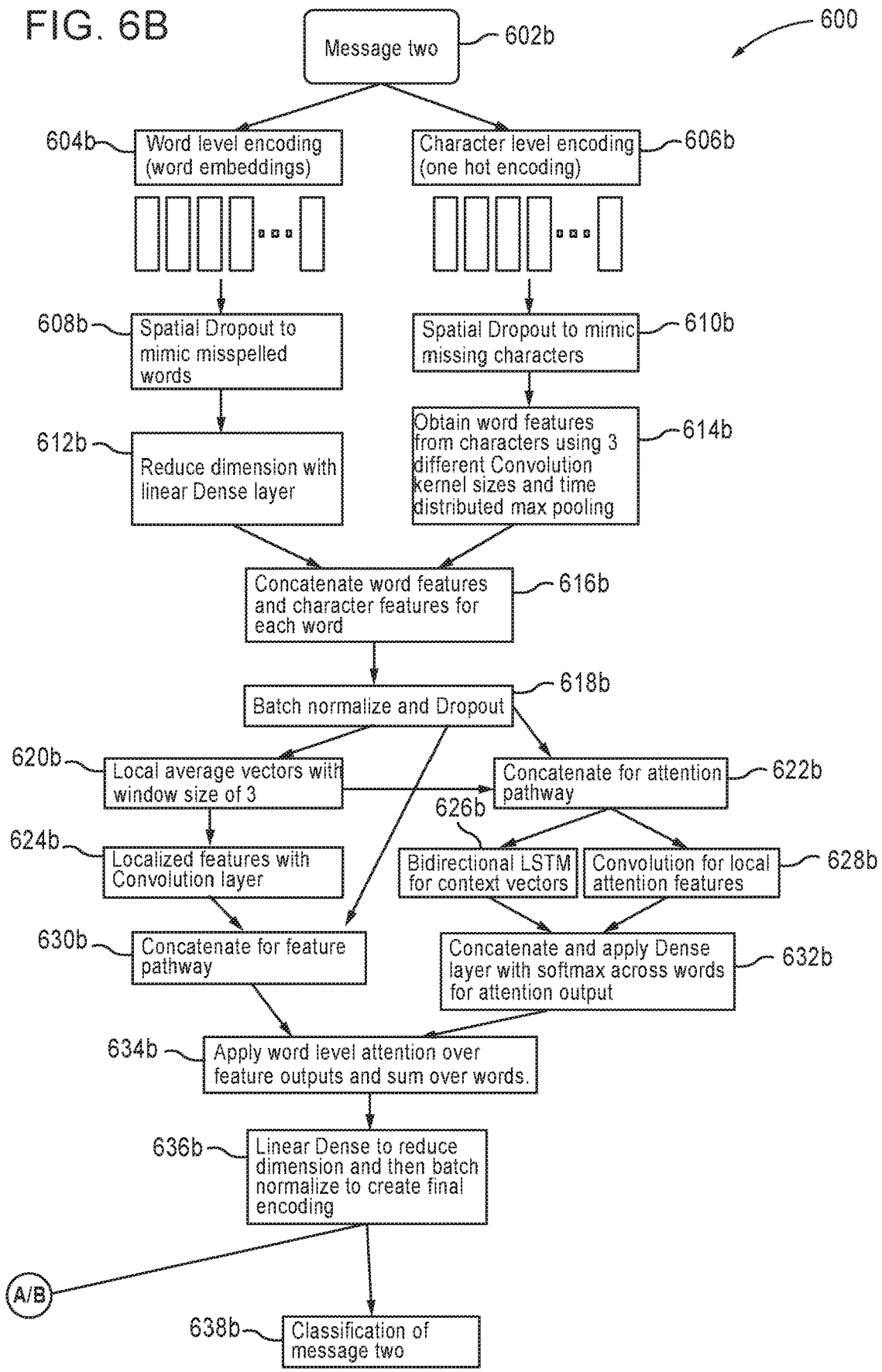

FIGS. 6A and 6B illustrate an example neural network architecture 600 employed by the chatbot to process communications from the user (e.g., user queries, user requests, messages, etc.). The neural network can be generated and employed by a processor (e.g., processor 106 and/or NLP server 110 in FIG. 1) and can be stored in a memory.

The neural network 600 encodes an incoming query as well as the data in the knowledge base. The NLP server uses a matrix multiplication external to the neural network to categorize the encoded query. For instance, the neural network 600 may encode a greeting from the user, such as "hello," and the NLP server may categorize the intent of the user as a greeting based on the encoding. In another example, the neural network 600 analyzes a question from the user, such as "What is FAFSA?" The NLP server understands the intent of this communication and categorizes this communication as a question related to the Free Application for Federal Student Aid (FAFSA). By using the NLP server to categorize encoded queries, the chatbot can add categories without changing the structure of and retraining the neural network. This allows the chatbot to update its knowledge base in seconds, giving a huge performance advantage over other approaches. In some aspects, the neural network 600 encodes a natural language message (e.g., a query or statement) from the user. This encoding transforms the natural language message into a mathematical form that can be manipulated more easily by a computer processor. The neural network 600 then compares the mathematical properties between the encoded forms of two natural language sentences to identify the semantic similarities between the two natural language sentences. For example, the neural network 600 can encode two natural language messages into corresponding vectors, thereby transforming them into respective mathematical representations. The neural network 600 can then determine the semantic similarity between the two natural language sentences by determining the angle between their vector representations.

It is also possible to create category vectors as well and compare the mathematical properties of a category vector with the mathematical properties of the query vector to see if the statement semantically belongs in that category. For instance, the NLP server may compare the query vector to the category vector as well as compare the query vector to individual utterance vectors within categories in the encoded knowledge base during the process of classifying the intent of the message. In addition the NPL server can help perform "garden tending" operations on the knowledge base to keep the data clean. For example, it can detect if there are duplicate categories by comparing category vectors.

FIGS. 6A and 6B illustrate how messages obtained from a user (e.g., message 602a and 602b) undergo two paths of encoding—a character-level encoding (e.g., at 606a and 606b) and a word-level encoding (e.g., at 604a and 604b). In some aspects, the neural network 600 includes a dictionary of words represented as word vectors. The words in the dictionary are encoded based on statistics indicating the correlation between each word and every other word. For example, words "good" and "great" have similarity 640 in statistics since they are often used interchangeably.

In some cases, the dictionary is generated without any pre-trained data and updated as the neural network 600 gets smarter. In other cases, a pre-trained, existing dictionary is augmented and tuned to focus on a particular application and is continuously updated with increased communication with users. For example, a pre-trained dictionary can be augmented and tuned to include jargon that appears in queries from students about counseling relating to admissions. Therefore, word-level encoding (e.g., at 604a and 604b) includes encoding the messages obtained from the user based on the dictionary.

The updates for the neural network as a whole may come from data in the knowledge base that is partially collected from user communications data and reviewed by triagers. The updates for the neural network itself (as opposed to the resulting encodings) may be updated periodically in single batches. The neural network can generalize categories from the categories it was trained on so the category encodings improve continuously as knowledge is added. And the entire encoding process in the neural network can also be improved with periodic retraining.

By implementing the two encoding paths (i.e., word-level and character-level), the neural network 600 can resolve user intent even if the messages (e.g., messages 602a and 602b) include misspellings. The correlation between word vectors (following word-level encoding) and character vectors (following character-level encoding) allows for misspellings. For instance, the neural network 600 can be trained by introducing noising (e.g., introducing random words or random spellings) into the training dataset. The chatbot system can be monitored to identify if the neural network 600 can handle the noising.

The neural network uses the word-level dictionary as the primary semantic base. However, if one character in the user's message is mistakenly embedded, the word-level dictionary may not return a value for the misspelled word. In such instances, the neural network 600 determines the correlation between the word vectors and the character vectors to determine the word and in turn determine user intent. For example, the neural network 600 may use correlations of the word-level encoding with the character-level encoding that it learned at training time. This character-level encoding gives the neural network 600 features for the word that can be detected even if the character-level or word-level description is malformed. These features are used to create the final utterance encoding. By implementing both character-level encoding and word-level encoding, the neural network can handle misspellings, acronyms, text shorthand, etc.

Spatial dropout is implemented during the training process on the encoded messages to mimic misspelled words (e.g., at 608a and 608b) and missing characters (e.g., 610a and 610b). Spatial dropouts improve the encoding performance and resilience to error when used at training time, but would degrade the performance if used at encoding time. The placement of the implementation of the spatial dropout process along the path following the encoding process significantly improves the performance of the neural network 600 and makes the neural network 600 more robust. Thus, spatial dropout is implemented on the encoded messages. In some aspects, the spatial dropout over word vectors mimics misspelled words while spatial dropout over characters mimics missing characters.

In the next layer, the neural network 600 obtains word features from characters using three different convolution kernel sizes and time-distributed max pooling (e.g., at 614a and 614b). That is, the neural network 600 captures lemmas, common prefixes, and/or commons suffixes of different types from characters by capturing the root of a word from the characters. (As understood by those of skill in the art of linguistics, lemmatization usually refers to doing things properly with the use of a vocabulary and morphological analysis of words, normally aiming to remove inflectional endings only and to return the base or dictionary form of a word, which is known as the lemma. The lemma in linguistic morphology is used to cite the lexeme of a word (the root meaning of many forms/inflections of a word).) At 612a and 612b, the neural network 600 reduces the dimension of the components with linear dense layer. Reducing the dimension improves the efficiency of the neural network 600.

The word features and character features are concatenated (e.g., at 616a and 616b) to align the word-level and character-level descriptions. At this point, the encoding of an entire word is now a concatenation of word-level and character-level encodings. Thus, the correlation between misspellings and actual word-vectors can be determined from the concatenated word-level and character-level encodings.

The word is now a concatenation of features from word-level encoding and character-level encoding. Therefore, the description of the word is in a certain number of dimensions and/or features. At 618a and 618b, a dropout is implemented on the final encoding of the word (e.g., the concatenated word-level and character-level encoding of the word). This improves the neural network's 600 resilience to lost and/or missing features. Some non-limiting examples of missing features include lemmas, suffixes, prefixes, etc. In addition, batch normalization is implemented at 618a and 618b to re-center the statistics of the words such that the statistics for the word remains stable. In one instance, the re-centering can include shifting the value for each feature to have a running average (average over batches) of 0 and running standard deviation of 1.0. The variances may be rescaled according to a parameter because some features should have higher variances than others. Batch normalization prevents the well-known covariate shift problem.

The next layer of the neural network 600 determines grammatical relationships between words and the focus loci for the sentences. The focus loci are used by the neural network to determine which portions of the user's statement are useful for determining the user's intent. For example, the focus loci are useful in determining the intent of a user from a long message where the user is narrating a story. At 620a and 620b, the neural network 600 determines combinations of words that are meaningful. For instance, the sum of the word vectors can be used to determine the meaning of the combination of those words. The combination of words can be sequence independent and is a three-wide sequence (i.e., word vectors of window size three). At 624a and 624b, localized features, including two-wide features, are obtained from the three-wide sequences with convolution layer and one or more sets of localized features are concatenated to obtain the feature pathway (e.g., at 630a and 630b). Obtaining 3-wide features is a two-step process: (1) word vectors are summed in windows of three; and (2) a one-wide convolution layer is used to detect features in the three-wide sums. The first step is shared by both the feature and attention pathways. But the two pathways have separate convolution steps.

At 622a and 622b, the batch-normalized and dropout features (e.g., features obtained after implementing 618a and 618b) are concatenated with localized features (e.g., features obtained after implementing 620a and 620b) to obtain individual word features and three-wide features. The three-wide features and individual word features are fed together to obtain an attention pathway (e.g., at 622a and 622b). In one aspect, different sets of localized features can be used to obtain the feature pathway and the attention pathway. In another aspect, the same set of localized features can be used to obtain both the feature pathway and the attention pathway.

A bidirectional Long Short-Term Memory (LS™) is then applied (e.g., at 626a and 626b) to obtain features that help detect the focus loci for the sentences. For example, the LS™ can detect and memorize focus loci for the beginning of a message and the end of the message. At 628a and 628b, a convolution layer is applied to obtain local attention features. The output of the LS™ and the features for attention are concatenated together (e.g., at 632a and 632b). A dense layer is applied with softmax across words for attention output. Softmax determines the probability of attention for each word. This produces an attention map over the entire message.

At this point, the neural network 600 takes the loci features (e.g., features obtained from feature pathway 630a and 630b) and the attention (e.g., attention obtained from attention map at 632a and 632b). The final vector is created as a sum over the vectors at the individual word positions. By that point each vector contains information about words to its left and right, so it may called a position vector instead of a word vector. The inputs come in as a sequence of positions. Each position initially only has information about the word at that position. But after the 3-wide features and the LS™, a position vector can include information about words in the input sentence, though they may be localized around the central word.

The individual weight of each word is the attention obtained for the word. In this manner, the neural network 600 applies word level attention over feature outputs and performs a summation over the words (e.g., at 634a and 634b). At 636a and 636b, the neural network 600 applies a linear dense layer to reduce the dimension of the encoding and then batch-normalizes the result to create the final encoding.

In training, the neural network 600 performs at least three tasks: 1) it quantifies and classifies the first message 602a in an accurate manner (e.g., performed at 638*a*); 2) it quantifies and classifies the second message 602*b* in an accurate manner (e.g., performed at 638*b*); and 3) it determines the similarity 640 between the first message 602*a* and the second message 602*b* (e.g., at 639). The parameters for the neural network 600 are tuned in a manner to reduce the error between the three objectives. In operation, the trained neural network encodes messages and categories.

In one aspect, the neural network 600 can augment, train, and understand new categories of data with no training time (e.g., in 5 seconds or less). For instance, the neural network 600 need not undergo re-training to classify new data within a category. Instead, the neural network 600 categorizes data in the first instance by determining the average vector of sentences that could be classified within a particular category. When new data is added to the neural network 600, the neural network 600 updates the average vector of sentences for that category to update the encoding for that category. Put differently, in response to encountering new data, the neural network 600 adds the vector encoding for the new data to the average vector for the corresponding data category. And when data is deleted, the neural network 600 subtracts the vector encoding from the average vector for that category. Note that the neural network 600 the neural network encodes online and may be trained offline to make it better at generalizing to unseen categories once it is being used online.

Example Questionnaire Schema Implemented by the Chatbot

An integrated questionnaire (e.g., a procedure implemented in the dialogue manager) that functions like a finite state machine has the following properties (with descriptions) as follows:

Name: a simple name for reference
Collection: a database reference to access and store information
Reminders: a series of reminder prompts with the following schema
    query: a database query to specify which users should receive reminders
    message: a string or template that constitutes the message sent to the end user
    after: the duration of inactivity to wait before sending the above message
Eligible: a function that determines whether a user is eligible for a particular questionnaire
processResponse: a function that processes and validates the user response against the specified schema
setUser: a function that sets the workflow for the current user
getState: a function that gets the user's current state
setState: a function that sets the user's current state
getObject: a function that gets the specified collection object
setObject: a function that sets the specified collection object
Run: a method that plays through the specified questionnaire
Initialize: a function that serves to create a new questionnaire
Finish: a function that is executed when the questionnaire is finished
Track: a set of functions that tracks progress through a questionnaire
Start: a function that is executed when a user begins a particular questionnaire abGroups: a specification to randomly sort users through one path or another, specifically for A/B testing and randomization of users
Next: a method for progressing to the next step in the questionnaire
Render: a method for rendering the current step to the user
loopingPrompts: an optional method for looping among a set of questionnaire steps
Steps: the sequence of questions for a particular questionnaire with the following schema
    Name: a unique name for reference of each step
    Field: a schema field on the specified Collection which the step will process and handle according to its type (Boolean, String, Date, Array, or Object)
    Custom: a custom schema to specify for validation purposes
    Prompt: a string or template that constitutes the message sent to the user
    multipleBooleans: an array of multiple choice options to present to the user
    Exclamation: an optional phrase prepended to the message
    Pause: an optional Boolean parameter to await a user response or continue to the next step
    Optional: a Boolean parameter to specify whether a step can be skipped or not
    Action: a custom function to specify any arbitrary action with the user's response
    Skip: a custom function that skips the current step if it returns "true"
    Fallthrough: a custom function that triggers a fallthrough if it returns "true Example Use Case In this manner, the present technology allows administrators and users to communicate using natural language, and train an artificially intelligent chatbot through an integrated triage and review process. The administrators do not need to write code or understand the underlying machine learning architecture. With increasing interactions, the chatbot becomes more and more accurate.

Consider the following use case for the chatbot systems and processes disclosed herein. An organization or institution's initial knowledge seed is developed first by assembling all factual textual data—website, FAQs, catalogues, etc.—and extracting meaningful data by means of commercially available tools, machine learning techniques, and human supervision to create a structured ontology of questions and corresponding answers.

When a student user engages with the chatbot system, the interaction begins with an initial message by the student or the system. Each subsequent student message is either a response to one of several types of chatbot system messages (yes/no, multiple choice, or free response) or an open-ended comment or question. Direct chatbot system responses are handled by the central processor or state machine (e.g., processor 106 in FIG. 1), resulting in a new user state and often but not always triggering a new message to the user. Open-ended messages are passed by the state machine to the NLP server for processing. After a message is processed, the NLP server returns a topic, answer, and confidence score if there is a matching understanding. Otherwise, the NLP server either returns an "I don't know" response, makes an external API call, or does nothing.

Any time the NLP server is triggered, the chatbot system generates a query log for an administrator to review. Administrators are then prompted (via a web interface) to approve or disapprove of the system's match. If an administrator disapproves of a match, the system then prompts the administrator with the top ten other matches by confidence score. If the "correct" match resides in that list, the administrator may select and optionally send the "correct" answer to the user. By selecting the "correct" match, the administrator also provides valuable reinforcement data back to the NLP server to improve the matching process for the future.

If no "correct" match is selected, the administrator then has the option to respond from scratch, ask a colleague for help (via the email-to-SMS bridge), or create a new understanding for the knowledgebase with that novel question and answer

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of training a chatbot, the method comprising:
   generating, via a processor, a first set of data to train the chatbot;
   generating, via the processor, a model based at least in part on the first set of data, the model being generated by at least one natural language processing technique;
   obtaining, via a user interface, a first query from a user;
   in response to the first query, transmitting, via the user interface, a question included in a workflow to the user, the workflow being generated based at least in part on the model;
   in response to the question, obtaining, via the user interface, at least a first response from the user;
   storing, in a memory, at least the first response as a second set of data to train the chatbot;
   updating, via the processor, the model based on the second set of data; and
   training, via the processor, the chatbot based at least in part on the model, wherein training the chatbot further comprises:
   obtaining, via the user interface, a second query from the user; and
   in response to the second query, generating, via the processor, a second response to the user based on the model.

2. The method of claim 1, further comprising:
   generating, via the processor, a confidence value for the second response, the confidence value indicating a probability with which the second response is an accurate response to the second query; and
   determining, via the processor, whether the confidence value for the second response is greater than a predetermined confidence threshold.

3. The method of claim 2, further comprising:
   in response to determining that the confidence value is greater than the predetermined confidence threshold, transmitting, via the user interface, the second response to the user.

4. The method of claim 2, further comprising:
   in response to determining that the confidence value is less than the predetermined confidence threshold:
     generating, via the processor, a plurality of choices, each of the plurality of choices being a possible response to the second query;
     transmitting, to an administrator, the second query and the plurality of choices;
     obtaining, from the administrator, a choice from the plurality of choices, the choice being selected by the administrator as a response to the second query; and
     transmitting, via the user interface, the choice as the response to the second query to the user.

5. A method of training a chatbot, the method comprising:
   generating, via a processor, a first set of data to train the chatbot;
   generating, via the processor, a model based at least in part on the first set of data, the model being generated by at least one natural language processing technique;
   obtaining, via a user interface, a first query from a user;
   in response to the first query, transmitting, via the user interface, a question included in a workflow to the user, the workflow being generated based at least in part on the model;
   in response to the question, obtaining, via the user interface, at least a first response from the user;
   storing, in a memory, at least the first response as a second set of data to train the chatbot;
   updating, via the processor, the model based on the second set of data; and
   training, via the processor, the chatbot based at least in part on the model, wherein generating the first set of data further comprises:
     scanning at least one of a pre-existing document or a website; and
     extracting information from the at least one of the pre-existing document or the website, the information being used for generating the first set of data.

6. The method of claim 1, wherein training the chatbot further comprises:
   obtaining, via the user interface, an approval or a disapproval of the second response from the user, the approval indicating an agreement by the user that the second response is an accurate response to the second query and the disapproval indicating a disagreement by the user that the second response is the accurate response to the second query; and
   updating, via the processor, the model based on the approval or disapproval.

7. A method for providing automated system-agnostic assistance to a user, the method comprising:
   obtaining, via a chat system interface, a query from the user, the query being in a first form compatible with a chat system;
   transforming, via a processor, the first form of query to a second form, the second form being compatible with an email system;
   transmitting, via an email system interface, the second form of the query to an administrator;

obtaining, via the email system interface, a response from the administrator, the response being in the second form compatible with the email system;

transforming, via the processor, the second form of the response to the first form, the first form being compatible with the chat system; and transmitting, via the chat system interface, the response to the user in the first form.

8. The method of claim 7, wherein obtaining the response from the administrator further comprises:

generating, via the processor, a model based on at least one natural language processing technique;

generating, via the processor, a plurality of responses based on the model, each of the plurality of responses being a possible response to the query;

transmitting, via the email system interface, the plurality of responses to the administrator; and obtaining from the administrator, via the email system interface, the response, the response being one of the plurality of responses.

9. The method of claim 8, wherein generating the model comprises:

extracting a first set of information from at least one of a pre-existing document or a website; and generating, via the processor, the model based on the first set of information.

10. The system for training a chatbot, the system comprising:

a processor to:

generate a first set of data to train the chatbot;

generate a model based at least in part on the first set of data, the model being generated by at least one natural language processing technique;

update the model based on a second set of data; and train the chatbot based at least in part on the updated model;

a user interface, communicatively coupled to the processor, to:

obtain a first query from a user;

in response to the first query, transmit a question included in a workflow to the user, the workflow being generated based at least in part on the model; and in response to the question, obtain at least a first response from the user; and a memory, communicatively coupled to the user interface and the processor, to store at least the first response as the second set of data to train the chatbot, wherein the user interface is further configured to:

obtain a second query from the user; and transmit a second response to the user; and the processor is further configured to:

generate the second response in response to the second query, the second response being generated based on the model.

11. The system of claim 10, wherein the processor is further configured to:

generate a confidence value for the second response, the confidence value indicating a probability with which the second response is an accurate response to the second query; and determine whether the confidence value for the second response is greater than a predetermined confidence threshold.

12. The system of claim 11, wherein the user interface is further configured to:

in response to determining that the confidence value is greater than the predetermined confidence threshold, transmit, the second response to the user.

13. The system of claim 11, wherein in response to the processor determining that the confidence value is less than the predetermined confidence threshold, the processor is further configured to:

generate a plurality of choices, each of the plurality of choices being a possible response to the second query;

transmit to an administrator the second query and the plurality of choices; and obtain from the administrator a choice from the plurality of choices, the choice being selected by the administrator as a response to the second query; and the user interface is further configured to:

transmit the choice to the user as the response to the second query.

14. The system for training a chatbot, the system comprising:

a processor to:

generate a first set of data to train the chatbot;

generate a model based at least in part on the first set of data, the model being generated by at least one natural language processing technique;

update the model based on a second set of data; and train the chatbot based at least in part on the updated model;

a user interface, communicatively coupled to the processor, to:

obtain a first query from a user;

in response to the first query, transmit a question included in a workflow to the user, the workflow being generated based at least in part on the model; and in response to the question, obtain at least a first response from the user; and a memory, communicatively coupled to the user interface and the processor, to store at least the first response as the second set of data to train the chatbot, wherein the processor is further configured to:

scan at least one of a pre-existing document or a website;

extract information from the at least one of the pre-existing document or the website; and generate the first set of data based on the extracted information.

15. The system of claim 10, wherein the user interface is further configured to:

obtain from the user, at least one of an approval or a disapproval to the second response, the approval indicating an agreement by the user that the second response is an accurate response to the second query and the disapproval indicating a disagreement by the user that the second response is the accurate response to the second query; and the processor is further configured to:

update the model based on at least one of the approval or the disapproval.

16. An automated system-agnostic assistant, comprising;

a processor;

a chat system interface, communicatively coupled to the processor, to:

obtain a query from a user, the query being in a first form compatible with a chat system;

transmit a response to the user in the first form; and
an email system interface, communicatively coupled to the processor, to:
   transmit a second form of the query to an administrator; and
   obtain the response from the administrator, the response being in the second form compatible with an email system; and
the processor to:
   transform the first form of the query to the second form, the second form being compatible with the email system; and
   transform the second form of the response to the first form, the first form being compatible with the chat system.

17. The automated system-agnostic assistant of claim 16, wherein the processor is further configured to:
   generate a model based on at least one natural language processing technique; and
   generate a plurality of response based on the model, each of the plurality of response being a possible response to the query; and
the email system interface is further configured to:
   transmit the plurality of responses to the administrator; and
   obtain from the administrator the response, the response being a response from the plurality of responses.

18. The automated system-agnostic assistant of claim 17, wherein the processor is further configured to:
   extract a first set of information from at least one of a pre-existing document or a website; and
   generate the model based on the first set of information.

* * * * *